(12) United States Patent
Qi et al.

(10) Patent No.: US 8,976,383 B2
(45) Date of Patent: Mar. 10, 2015

(54) METHOD AND SYSTEM FOR DOCUMENT PRINTING MANAGEMENT AND CONTROL, AND DOCUMENT SOURCE TRACKING

(75) Inventors: Wenfa Qi, Beijing (CN); Shuchang Han, Beijing (CN); Gaoyang Wang, Beijing (CN); Lidong Wang, Beijing (CN); Bin Yang, Beijing (CN)

(73) Assignees: Peking University Founder Group Co., Ltd., Beijing (CN); Peking University, Beijing (CN); Beijing Founder Electronics Co., Ltd., Beijing (CN); Peking University Founder R&D Center, Beijing (CN)

( * ) Notice: Subject to any disclaimer, the term of this patent is extended or adjusted under 35 U.S.C. 154(b) by 0 days.

(21) Appl. No.: 13/976,335

(22) PCT Filed: Dec. 27, 2011

(86) PCT No.: PCT/CN2011/084760
§ 371 (c)(1),
(2), (4) Date: Sep. 5, 2013

(87) PCT Pub. No.: WO2012/089109
PCT Pub. Date: Jul. 5, 2012

(65) Prior Publication Data
US 2013/0335785 A1 Dec. 19, 2013

(30) Foreign Application Priority Data
Dec. 27, 2010 (CN) .......................... 2010 1 0622221

(51) Int. Cl.
| | |
|---|---|
| G06F 3/12 | (2006.01) |
| G06K 15/02 | (2006.01) |
| H04L 9/32 | (2006.01) |
| H04N 1/44 | (2006.01) |
| H04L 29/06 | (2006.01) |
| H04L 29/08 | (2006.01) |
| G06K 15/00 | (2006.01) |

(52) U.S. Cl.
CPC ............ *G06F 3/1238* (2013.01); *G06F 3/1222* (2013.01); *G06F 3/1288* (2013.01); *H04L 63/102* (2013.01); *H04L 67/34* (2013.01);
(Continued)

(58) Field of Classification Search
None
See application file for complete search history.

(56) References Cited

U.S. PATENT DOCUMENTS 8,154,742 B2 * 4/2012 Kawakami et al. .......... 358/1.15
8,358,427 B2 * 1/2013 Hirahara et al. ............. 358/1.14
(Continued)

FOREIGN PATENT DOCUMENTS

| CN | 1808415 A | 7/2006 |
| CN | 101140504 A | 3/2008 |

(Continued)

OTHER PUBLICATIONS

Li et al., "Techniques Research of Printing Monitor and Audit", Computer Engineering and Design, 2009, p. 484-486, Issue 2.

*Primary Examiner* — Scott A Rogers
(74) *Attorney, Agent, or Firm* — The Webb Law Firm

(57) ABSTRACT

Disclosed is a method and system for document printing management and control and source tracking. A printing management service program runs at a server end. A printing monitoring service program runs at a client end. The printing management service program saves client end information, monitors and manages a client end computer, sets a printing management policy, and delivers operation instructions to the client end. The printing monitoring service program collects the client end information, sends the client end information to the server end, and executes the operation instruction.

16 Claims, 6 Drawing Sheets

(52) U.S. Cl.
CPC .......... *H04L67/125* (2013.01); *G06K 15/4095*
(2013.01); *H04L 63/20* (2013.01)
USPC .............. 358/1.14; 358/1.15; 709/229; 726/4

(56) References Cited

U.S. PATENT DOCUMENTS

| | | | |
|---|---|---|---|
| 8,526,037 B2 * | 9/2013 | Emori et al. | 358/1.15 |
| 8,681,357 B2 * | 3/2014 | Sato et al. | 358/1.15 |
| 2007/0247664 A1 * | 10/2007 | Yamamoto | 358/1.16 |
| 2008/0055630 A1 * | 3/2008 | Hu et al. | 358/1.15 |
| 2013/0182288 A1 * | 7/2013 | Nakamura | 358/1.15 |

FOREIGN PATENT DOCUMENTS

| | | |
|---|---|---|
| CN | 101187994 A | 5/2008 |
| CN | 100549936 C | 10/2009 |
| JP | 2007125852 A | 5/2007 |
| KR | 20020024231 A | 3/2002 |

* cited by examiner

METHOD AND SYSTEM FOR DOCUMENT PRINTING MANAGEMENT AND CONTROL, AND DOCUMENT SOURCE TRACKING

CROSS-REFERENCE TO RELATED APPLICATIONS

This application is a U.S. national phase under 35 U.S.C. §371 of International Application No. PCT/CN2011/084760 filed Dec. 27, 2011, entitled "Method and System for Document Printing Management and Control and Document Source Tracking," and claims priority under 35 U.S.C. §119 (a)-(d) to Chinese Patent Application No. 201010622221.4, filed on Dec. 27, 2010 in the Chinese Intellectual Property Office, which are hereby incorporated by reference in their entirety.

FIELD OF THE INVENTION

The present invention relates to the technical field of document printing management and control, more particularly, to methods and systems for document printing management and control, and document source tracking.

BACKGROUND OF THE INVENTION

With rapid development of digital technology, at present many industries and individuals commonly use electronic documents to process data and store information, and contents in the electronic documents are generally displayed on paper by means of printing, copying, and the like, for reading and dissemination. However, for enterprises and institutions, political parties and government agencies, and departments relating to state security and the like usually involving a large amount of confidential information (such as contract, secret, and similar important documents), a lot of important information or confidential information is very likely to be leaked out through these paper documents. Therefore, it is necessary to take some security measures to prevent leaking of document information caused by paper documents generated through printing, copying, and similar operations. However, with gradual increase in volume of business of each unit, continuous expansion of unit size, and increase of staff number, costs and difficulties of various management increase accordingly, and it is difficult for administrator or leader to timely control document printing situations within the unit, bringing big challenges to security measures to some extent, and increasing possibility of leaking of important document information. Further, for printed paper documents and their copies, generally source of document printing cannot be identified and printing content cannot be audited due to lack of document source tracking information, leading to ad libitum printing of paper documents and intentional or unintentional illegal dissemination, and further increasing difficulties in document printing management and control. Therefore, researches on printing process management and control of electronic documents, document source tracking, and content auditing are important and challenging topics.

At present, printer can be basically divided into four types: local printer, shared printer, network printer and virtual printer. For ordinary enterprises and institutions, shared printer, network printer and virtual printer are generally used for printing, while for enterprises and institutions with high confidentiality requirements, such as security offices (for example army), in consideration of business requirements or safety, means like network printing are seldomly used, and in more situations local printer is used for printing, that is, each client computer is directly connected to a physical printer for printout, and respectively manages its own printed documents, avoiding the problem of information leakage therebetween.

At present, printing monitoring and auditing technology implements printing management and control mainly through deploying printing management and control service program to client. When user initiates printing operation, printing management and control service program deployed to the client can obtain print job information and printing document data stream by monitoring print port or the like, and then save the printing record information in a database server, or save the printing document data stream on a file server. The printing service program on the server performs related processing after obtaining a related printing request, for example, saving the printing information record and the original printing content, then performs printout according to the user's request, thus completes the entire document printing control process. This method achieves the purpose of centralized management and control of document printing to some extent, but the following problems exist: first, configuration information on the client is not flexible enough, management and control means is relatively simple, specifically, only control of print permission to a printer can be achieved, for example, whether a client can use the printer can be controlled, while for different types of printers, different types of application programs, and different models of printers, personalized setting cannot be performed, and printing control strategy also cannot be dynamically updated in real time, but is achieved only by means of registration and the like; second, for printed paper documents and their copies, effective means of source tracking cannot be provided, and therefore the purpose of actual print job auditing cannot be achieved, and defects in closed-loop management of paper documents exist. More details on these types of printer monitoring and auditing technology researches can be found in the article "Techniques research of printing monitor and audit" published in « Computer Engineering and Design» , No. 2, 2009.

Furthermore, at present some other methods of implementing printing management and control operation have also been proposed. For example, in Chinese patent application "Document printing management and control system and method" with application No. 200610156904.9, a method for monitoring printing of confidential document is proposed. This method involves document format conversion, and requires backing up the original data of the confidential document at different levels in advance for comparison and checking, thus has poor flexibility. In another example, in Chinese patent application "Multi-point document printing control system and method" with application No. 200510032985.7, a printing management and control method by means of virtual printing is proposed. This method can monitor multiple printers through resource safety control center checking whether a print job is illegal according to printing strategy saved thereon. The disadvantage of this method is that judgment rules for all printers are unified, and cannot have personalized setting for different clients. At the same time, all these methods lack means of document source tracking and contents auditing.

SUMMARY OF THE INVENTION

To solve the above problems, the present invention provides a method and system for document printing management and control, and document source tracking, in order to improve the control level of printing operation on clients, increase the flexibility of printing control strategy setting, provide effective means of document source tracking and contents auditing, and prevent ad libitum printing and illegal dissemination of important paper documents.

To achieve the above objectives, the method for document printing management and control provided by the present invention includes the following steps: deploying and running printing management service program on a server, the printing management service program is used to save client information, monitor and manage client computer, set printing management strategy, and transmit operation instruction of performing the printing management strategy to client; deploying and running printing monitoring service program on the client, and the printing monitoring service program is used to collect the client information, and send the collected client information to the server, perform the operation instruction transmitted from the server, and manage printing operation, wherein, the printing management service program deployed on the server and the printing monitoring service program deployed on the client perform document printing management and control operation according to the following steps: the printing monitoring service program on the client collects client information every time the client computer restarts, and sends the collected client information to the server; the printing management service program on the server saves the client information, and monitors and manages power-on state of the client computer and operation state of the printing monitoring service program; the printing management service program on the server sets the printing management strategy, and transmits the operation instruction of performing the printing management strategy to the client, the printing management strategy includes authorizing at least one of the following to client printer: model, name, printer type, application program type and confidential level of printing document; the printing monitoring service program on the client performs the operation instruction transmitted from the server, and manage the printing operation.

Preferably, when the printing monitoring service program on the client sends the collected client information to the server, printing monitoring service program checks whether same client information already exists in a client information database specified by the server, and if the same client information does not exist in the client information database, the client information is saved in the client information database.

Preferably, the client information includes user name of the client, IP address of computer, network card MAC address and list information of all installed printers.

Preferably, the printing management service program on the server monitors and manages the power-on state of the client computer and the operation state of the printing monitoring service program according to the following steps: detecting whether the client computer is on; if the client computer is in power-on state, further detecting whether the printing monitoring service program on the client runs normally; if the client computer is in power-on state, but the printing monitoring service program on the client runs abnormally, sending a error message to administrator.

Preferably, the printer type includes at least one of local printer, shared printer, network printer and virtual printer.

Preferably, the printing management service program on the server sets the printing management strategy, which further includes setting sensitive keywords of document title, restricting print job with the sensitive keywords existing in the document title from being normally printed out, or automatically converting the print job for manual review, and the print job can only be printed after being approved by the administrator.

Preferably, the step that the printing monitoring service program on the client manages the printing operation includes the following steps: when user of the client opens a document editing application program and selects a printer to output print job, the printing monitoring service program on the client intercepts a printing operation instruction, extracts print job information, and sequentially executes the operation instruction transmitted from the server to determine whether printing operation conforms to authorization conditions in the printing management strategy set in the printing management service program on the server, and terminates illegal printing operation not conforming to the authorization conditions, the print job information includes at least one of printing time, IP address of computer, user name, name of application program, printer type, printer name, document title, number of copies and printing page number; for a legal print job, the printing monitoring service program records the print job information, saves the print job information in the print job information database as an information record, and returns a database key value identifying the information record; the printing monitoring service program sends a JOB-RESUME message to control the printer to print page by page, and sequentially intercepts data stream of each page of the printed document or a part thereof; after finishing processing the legal printing operation, the printing monitoring service program records the intercepted data stream of each page of the printed document or a part thereof in image format, and uploads these image documents to a file server for backup according to the returned database key value.

Preferably, the printing management service program on the server sets the management strategy, which further includes setting document source tracking information.

Preferably, the step that the printing management service program on the server sets the document source tracking information includes the following steps: whether the document source tracking information is embedded is set according to difference in time periods; whether the document source tracking information is embedded is set according to difference in application programs; carrier type of the embedded document source tracking information is set; unit code information is designated as the document source tracking information.

Preferably, the carrier type includes at least one of the followings: word, image, and table in the document's own contents, and extra information carrier.

Preferably, the extra information carrier is perturbing dots and/or one- or two-dimensional barcode.

Preferably, when the printer prints main page, the printing monitoring service program embeds the document source tracking information in the printed paper document using watermarking embedding algorithm.

Preferably, the document source tracking information includes at least one of the followings: unit code information designated by the server, the returned database key value, and any item included in the print job information, or their combinations.

In another aspect, the present invention provides a method for document source tracking, which includes the following steps: executing the above method for document printing management and control to embed the document source tracking information in the printed paper document; converting the printed or copied paper document into image data document in electronic format through a scanner; running an identification algorithm corresponding to the watermarking embedding algorithm used to embed the document source tracking information to detect the document source tracking information; identifying source of the printing document from the print job information enquired in the print job information database according to the unit code information in the detected document source tracking information, and/or according to the database key value in the detected document source tracking information; and downloading image document backup from the file server using the database key value in the detected document source tracking information, and the downloaded image document is compared with the printed paper document.

Correspondingly, the present invention provides a system for document printing management and control, and document source tracking, which includes: server, which is deployed with printing management service program, the printing management service program is used to save client information database, monitor and manage client computer, set printing management strategy, and transmit operation instruction of executing the printing management strategy to client; client, which is deployed with printing monitoring service program, the printing monitoring service program is used to collect the client information, send the collected client information to the server, and execute the operation instruction transmitted from the server to manage printing operation; client information database, which is used to save the client information collected by the client; print job information database, which is used to save print job information; and file server, which is used to save and record intercepted data stream of each page of document or image document of part of it.

It can be seen from the above technical solution that the present invention can achieve the following technical effects: 1) through authorizing printers of different models, names and types, application programs of different types, and printing documents of different confidential levels in the printing management strategy, personalized settings for different clients are achieved, printing from illegal application program is prohibited, and control level and safety of printing at clients are improved; 2) through setting of sensitive keywords in the printing management strategy, printing operation of document including sensitive keywords is filtered, sensitive or confidential information is effectively prevented from leaking via printing, and safety of document printing is further enhanced; 3) the printing management strategy can be dynamically updated in real time through the printing management service program deployed on the server, but not only be set by means of registration, and thus flexibility of printing control strategy setting is improved; 4) through embedding document source tracking information in the printed paper documents, hidden document source tracking information therein can be extracted from the printed paper document and its copies to restore detail print job information, conveniently tracking source of the printing document and obtaining image file of the printing contents, and thus more accurate, quicker and more effective content auditing means is provided, actual content auditing purpose is achieved, and defect in closed-loop management of paper documents is resolved.

DETAILED DESCRIPTION OF CERTAIN EMBODIMENTS

The concept of the present invention is deploying and running printing management service program on server, the printing management service program is used to gather and save various kinds of data collected by client, is responsible for monitoring and managing client computer, sets printing management strategy, transmits operation instruction of performing the printing management strategy to the client, and provides convenient and flexible management, query, filing, search and other functions of printing record log information. At the same time, deploying and running printing monitoring service program on the client, the printing monitoring service program is used to collect various kinds of data of the client, transmits the collected data to the server, performs the operation instruction transmitted from the server, and manages printing operation of the client. Furthermore, to implement document source tracking and content auditing, when the client performs printing operation, the printing monitoring service program embeds document source tracking information into printed paper document. When paper document considered being illegally printed, copied and disseminated is obtained, the paper document can be digitized into image document in electronic format by a scanner, then an identification algorithm corresponding to the embedded document source tracking information algorithm is run to extract related document source tracking information, thus the source of the printed document is identified, and contents of the document are audited. Hereinafter, the present invention will be described in detail in conjunction with the accompanying drawings and embodiments.

The First Embodiment

Figure 1:
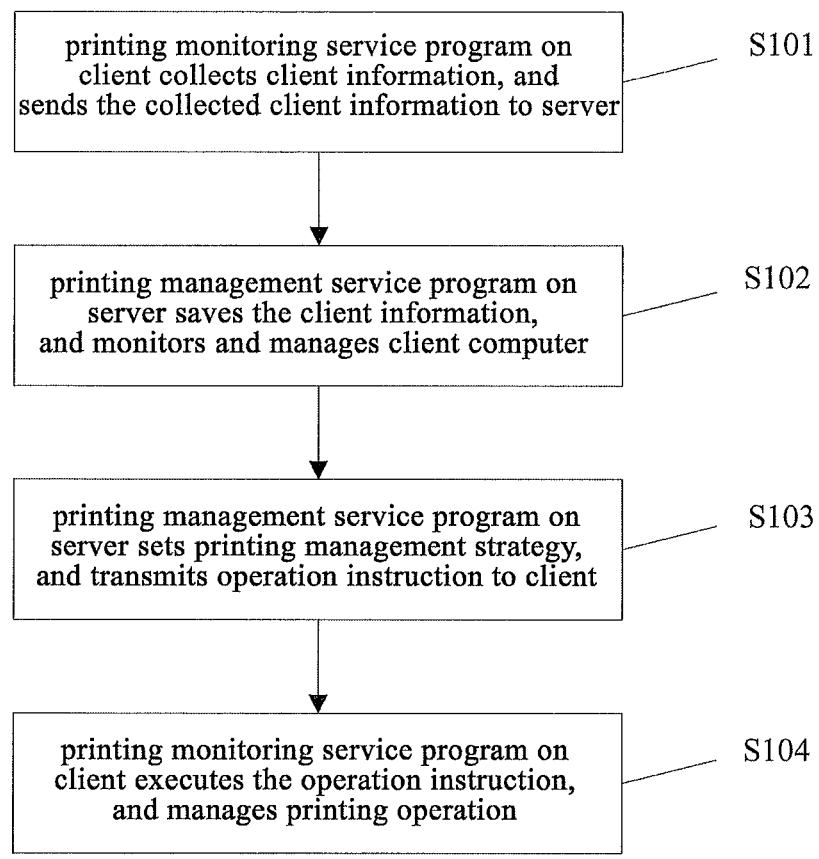
FIG. 1 is a flow chart of a method for document printing management and control according to an embodiment of the present invention.

FIG. 1 is a flow chart of a method for document printing management and control according to an embodiment of the present invention. Referring to FIG. 1, printing management service program deployed on a server and printing monitoring service program deployed on a client perform document printing management and control operation according to the following steps.

First, in step S101, the printing monitoring service program on the client collects client information every time a client computer restarts, and sends the collected client information to the server, the collected client information includes user name of the client, IP address of computer, network card MAC address and list information of all installed printers.

When the printing monitoring service program on the client sends the collected client information to the server, the printing monitoring service program checks whether same client information already exists in client information database specified by the server, if the same client information does not exist in the client information database, this client information is saved in the client information database. Especially for a printer newly installed on the client having no print permission after being installed, it is necessary to register the name of the newly installed printer in a database (such as, MS SQL, Oracle and MySQL) of the server, after which the printing management service program on the server can perform permission assignment according to a print management strategy, which will be described in detail below, and only then normal printout can be performed.

Next, in step S102, the printing management service program on the server saves the client information collected by the client in the client information database designated by the server, and monitors and manages the power-on state of the client computer and the operation state of the printing monitoring service program.

Specifically, the printing monitoring service program first detects whether the client computer is on, and in general, whether a computer with specific IP address is on is detected by means of executing a ping command. If the security setting on the client disables ping, the MAC (Media Access Control) address of the computer can then be tried to be resolved through the IP address of the client, then the resolved MAC address is compared with MAC addresses in the database (such as, MS SQL, Oracle and MySQL), and if the MAC addresses completely match, the IP address of the client is proved to be in power-on state. Of course, other protocols can be used for power-on state detection, such as SNMP protocol, or TCP/IP protocol. If the client computer is in power-on state, then further detect whether the printing monitoring service program on the client runs normally, which can be proved by establishing conversation between the sever and the client through TCP/IP protocol, and exchange of real-time messages. If the client computer is in power-on state, but the printing monitoring service program on the client runs abnormally (for example, when the printing monitoring service program on the client is sabotaged intentionally or unintentionally, or client computer reinstalls operating system), the printing management service program on the server can send an error message to the administrator in good time by means of instant communication or automatic email delivery, so that the administrator can understand the situation on the client in good time, and perform effective system maintenance and repair.

Then, in step S103, the printing management service program on the server sets printing management strategy, and transmits operation instruction of performing the printing management strategy to the client.

Figure 2:
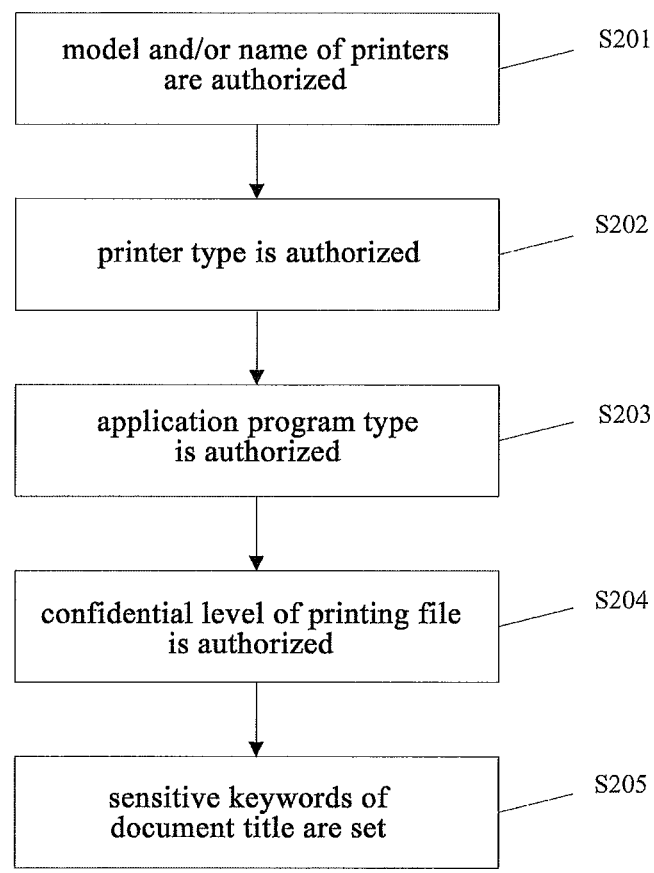
FIG. 2 is a flow chart of setting a printing management strategy according to an embodiment of the present invention.

The setting of printing management strategy is decided according to practical application needs, and in the present embodiment, the printing management strategy is set in accordance with the flow illustrated in FIG. 2:

Step S201: model and/or name of the client printer are authorized, that is, the printing management service program limits the client computer to use printer of specific model or name only, and this can effectively and reasonably assign print resources;

Step S202: printer type is authorized, that is, the printing management service program regulates use permissions to local printers, shared printers, network printers and virtual printers for client computer, and thus effectively ensuring printing of safe documents. For example, for document in file format saved by some dedicated application system, it cannot be opened and browsed by other application programs, but it can be converted into PDF file by the client through a virtual PDF printer. At this time, if the use permission of similar virtual printers is effectively controlled, the safety of document data can be greatly improved;

Step 203: application program type is authorized, that is, only specific document editing application program can perform print job output, for example document can only be printed through MS office. This can prevent printing electronic document edited by illegal document editing application programs, thus effectively avoiding sensitive or confidential information from leaking via printing;

Step 204: confidential level of printing file is authorized, for example, the client can be limited to be able to print only documents of secret and confidential class, while documents of top secret class are prohibited from being output from any printer; for the definition of document confidential level, supporting of other technical means may be required to fulfill formulation of the strategy, that is, the printing monitoring service program on the client must be able to obtain the confidential level information of the electronic document to be printed, which can be obtained by the following two ways generally: 1) integrating OA (office automation) system within the unit or dedicated document security system, these systems can classify and manage all electronic documents according to their own rules, formulate confidential level information of all documents, and feedback this information to the printing monitoring service program to perform confidential level authorization management; 2) for application system supporting secondary development of plug-in mechanism, digital watermarking information identifying document confidential level can be embedded in electronic document through the plug-in mechanism, the information circulates in LAN environment along with the electronic document. When printing, the printing monitoring service program can call a digital watermarking information extraction module provided by third party to obtain the confidential level information of the document in real time, and perform corresponding authorization management, which ensure the safety of the electronic document to a greater extent, and greatly reduce risk of leaking confidential information;

Step S205: sensitive keywords of document title are set. When printing, the printing monitoring service program on the client is responsible for filtering keywords in document title, and restricts a print job with sensitive keywords in the document title from being printed out normally, or converts the print job to manual review, and the print job can only be printed after being approved by the administrator.

By authorizing printers of different models, names and types, application programs of different types, and printing documents with different confidential levels in the above, personalized settings for different clients are achieved, printing by illegal application program is prohibited, and control level and safety of printing on the clients are improved. Further, through setting of sensitive keywords, sensitive or confidential information is effectively prevented from leaking via printing, and safety of document printing is further improved.

Herein, it should be pointed out that the setting flow of the printing management strategy illustrated in FIG. 2 above is only exemplary, and according to practical needs, a printing control strategy can also be set in different sequence, or other printing control strategies can be set in the printing management service program. For example, certain time period can be set, in which printing is allowed or refused, or is automatically converted to manual review, and can only be printed after being approved by the administrator; maximum print page number of a single job is set, and exceeding part is refused to be printed; users are assigned to a printer, and only specific users can use that printer; and the like.

At last, in step S104, the printing monitoring service program on the client performs the operation instruction transmitted from the server, and manages printing operation.

Figure 3:
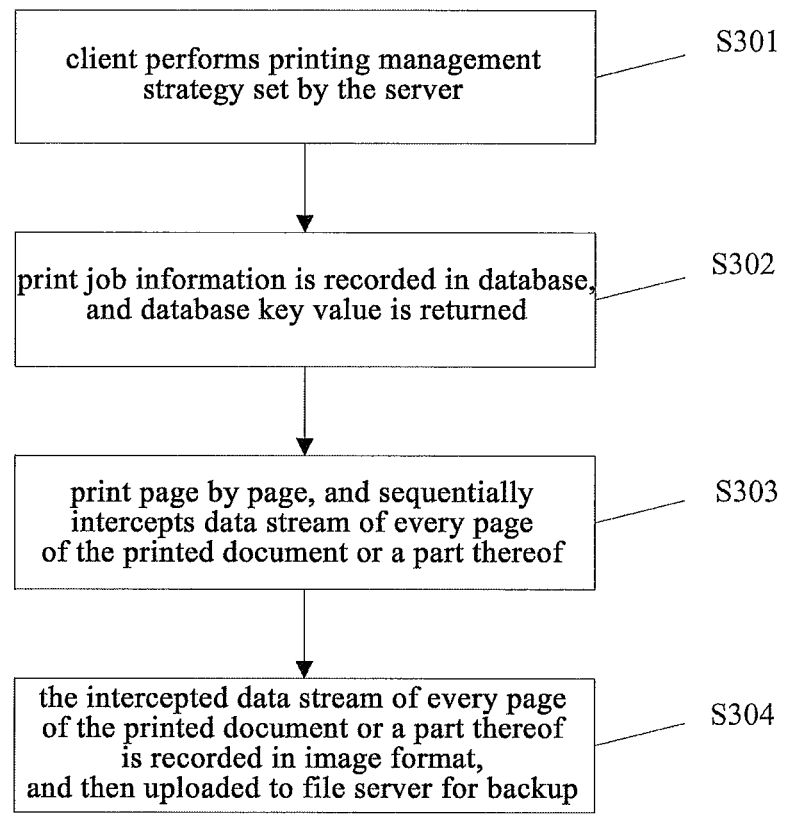
FIG. 3 is a flow chart of a printing process performed by a client according to an embodiment of the present invention.

In the present embodiment, the client performs printing processes according to the steps illustrated in FIG. 3:

Step 301: the client performs printing management strategy set by the server, specifically, when a user of the client opens a document editing application program and selects a printer for printing, the printing monitoring service program on the client can monitor the print job occurrence situation of the printer using multi-thread, and then perform processing through message processing mechanism, respectively. For example, print jobs in Windows systems are mainly processed by Spooling subsystem, local print providers therein provide complex and detailed job scheduling and control information, and such information can be captured. Multi-thread is initiated to monitor the Spooling subsystem. If printing processing message is found, JOB-PAUSE message is sent to the Spooling subsystem, print job information (including at least one of printing time, IP address of computer, user name, name of application program, printer type, printer name, document title, number of copies and number of printing pages) is extracted, and operation instruction transmitted from the server is sequentially executed to determine whether the printing operation conforms to authorization conditions in the printing management strategy set in the printing management service program on the server. If one of them does not conform to the requirements, the printing operation is determined to be illegal. At this time, the printing monitoring service program sent a JOB_DELETE message to the Spooling subsystem, and thus ending this printing operation;

Step 302: for a legal print job, the printing monitoring service program records print job information, saves this print job information in a print job information database as a record, and returns the database key value of this record.

Step S303: the printing monitoring service program sends a JOB-RESUME message to control the printer to print page by page, and sequentially intercepts data stream of every page of the printed document or a part thereof;

Step 304: after processing the legal printing operation, the printing monitoring service program records the intercepted data stream of every page of the printed document or a part thereof in image format, and uploads these image documents to file server for backup according to the returned database key value for use of subsequent content auditing.

In addition, the printing management service program on the server further provides convenient and flexible printing record information management, checking, filing, searching and other functions, print job information of the client, and image documents of printing contents can be checked, and if necessary, statistics, analysis and file export on related data can be performed.

It can be seen from the above technical solution that the printing management strategy in the printing management service program deployed on the server can be updated dynamically according to practical needs, and thus flexibility of printing control strategy setting is improved.

The Second Embodiment

The differences between the present embodiment and the first embodiment are, adding a step of setting document source tracking formation when setting printing management strategy in the printing management service program on the server, and source tracking formation (such as user name, machine name, printer name, printing time, printing document name, etc.) is embedded in a printed paper document using digital watermarking embedding algorithm when printing, thus more effective and complete means of paper document source tracking and content auditing is provided.

Figure 4:
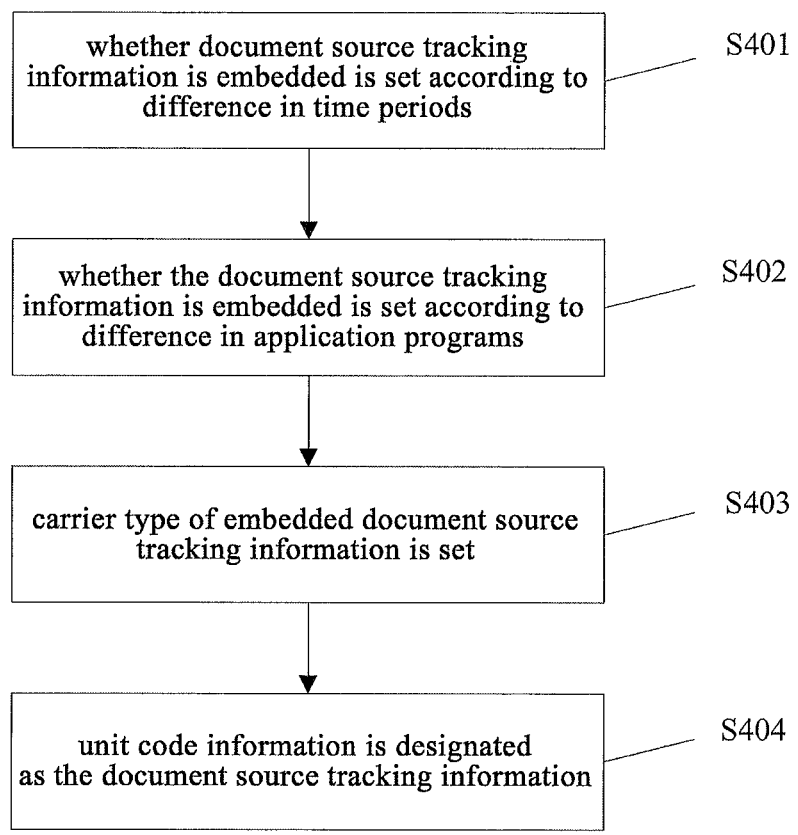
FIG. 4 is a flow chart of setting document source tracking information according to an embodiment of the present invention.

In the present embodiment, document source tracking information is set according to the flow chart illustrated in FIG. 4:

Step S401: whether document source tracking information is embedded is set according to difference in time periods, specifically, according to actual needs, printing management service on the server can permit the client to embed the source tracking information in document contents in a time period, while the source tracking information cannot be embedded in another time period;

Step S402: whether the document source tracking information is embedded is set according to difference in application programs, specifically, for dedicated application programs, for example, library card printing of library, and accounting certificate cover printing of finance department, etc., these printouts have little content information, generally in which a large amount of document source tracking information cannot be embedded, and this kind of certificate is not allowed to be modified in any manner. At this time, embedding the document source tracking information may be disallowed for this kind of application program. While for other text documents, for example, an official document typeset using MS Office Word, this kind of documents does not only have more word information but also includes confidential information. At this time, the document source tracking information can be forced to be embedded in real time for document printed out by Word application system;

Step S403: carrier type of the embedded document source tracking information is set, specifically, the printing management service program can set two carrier types of embedded information: 1) one type is that the carrier of the embedded information is the own element of content of a document, such as a word block object, image object, and table object, etc. therein, and we can respectively use different digital watermarking embedding algorithms to embed information; 2) the other type is that extra carrier can be used to embed information, and then the carrier having embedded watermarking information is combined with the original document content for print out. This manner is especially applicable for embedding large amount of information, for example, method based on perturbing dots recorded in application no. 200510125727.3 can be used to embed and extract watermarking. Of course, relatively mature barcode technology can also be used, such as one-dimensional or two-dimensional barcode as carrier type for embedding the document source tracking information;

Step S404: unit code information is designated as part or whole of the document source tracking information, specifically, the printing management service program designates the unit code information, and causes the client to embed the designated unit code information in a printed paper document as part or whole of the document source tracking information, and after the printing document is intercepted and identified, the unit to which the document belongs can be known easily.

After the above interactions between the server and the client, the client obtains the latest printing management strategy. In later printing process, the printing monitoring service program on the client can specifically execute the related printing management strategy, and manage operation according to instruction sent from the printing management service program, the specific flow being substantially the same as the flow illustrated in FIG. 3, and the difference is that when the printer is printing in step S303, the printing monitoring service program embeds the document source tracking information in the printed paper document using watermarking embedding algorithm. In the present embodiment, the document source tracking information can include the unit code information designated by the server, the returned database key value, and information on year of printing, or any other information in the print job information. For example, the embedding and extracting methods of digital watermarking for digital image mentioned in application no. 200710063389.4 can be used, the above related source tracking information is buried in the document's content, and this method can better resist uncertainty attacks on printing, scanning and copying, with good robustness.

Figure 5:
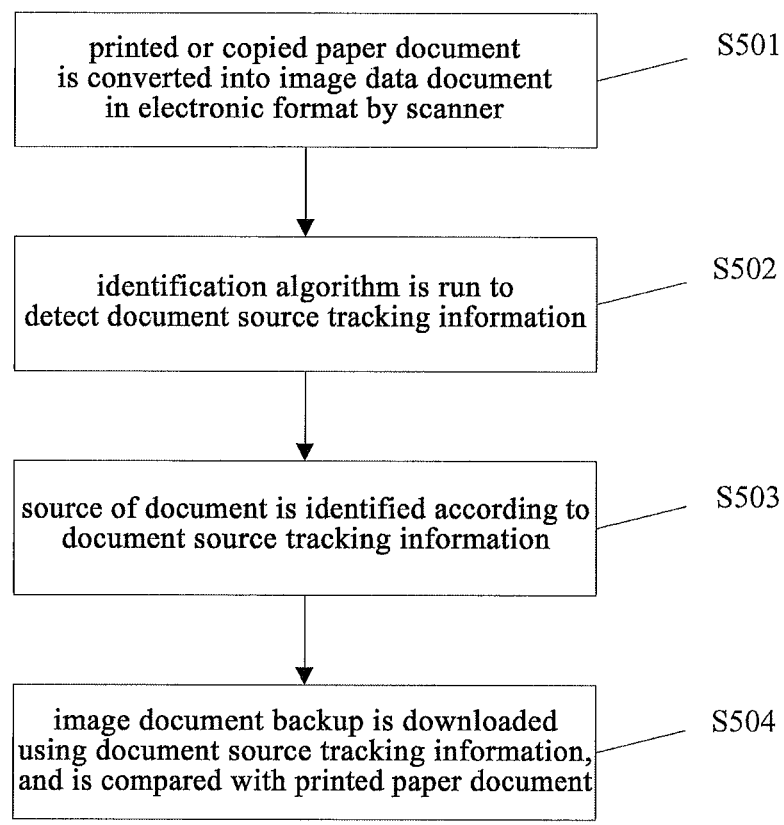
FIG. 5 is a flow chart of a method for document source tracking according to an embodiment of the present invention.

After embedding the document source tracking information in the printed paper document, source tracking and content auditing can be performed on the printed or copied paper document through the flow chart illustrated in FIG. 5:

Step S501: the printed or copied paper document is converted into image data document in electronic format by a scanner;

Step S502: an identification algorithm corresponding to the watermarking embedding algorithm used to embed the document source tracking information is run to detect the document source tracking information;

Step S503: source of the printing document is identified from printer job information enquired in a print job information database according to the unit code information in the detected document source tracking information, and/or according to the database key value in the detected document source tracking information;

Step S504, image document backup is downloaded from the file server using the database key value in the detected document source tracking information, and the downloaded image document is compared with the printed paper document.

Through the above document source tracking method, whenever and wherever, after obtaining a document considered to be illegally copied and disseminated, the source of the printing document can be tracked, and printing contents and its confidentiality can be audited by extracting its hidden document source tracking information, and thus holding the related personnel accountable. Therefore, through this method, more complete original information of the printing document can be provided, and thus achieving an actual content auditing method.

Figure 6:
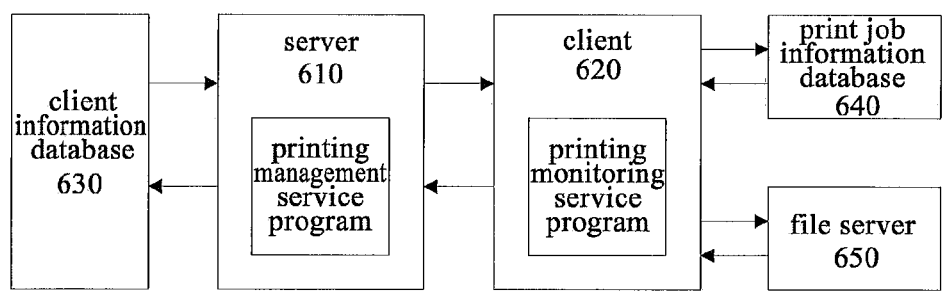
FIG. 6 is a block diagram of a system for document printing management and control according to an embodiment of the present invention.

Hereinafter, a system for document printing management and control, and document source tracking according to an embodiment of the present invention will be described referring to FIG. 6. As illustrated in FIG. 6, the system includes: server 610, which is deployed with the printing management service program, the printing management service program is used to save client information database, monitor and manage client computer, set printing management strategy, and transmit operation instruction of executing the printing management strategy to the client, the client information database is used to save client information collected by client; client 620, which is deployed with the printing monitoring service program, the printing monitoring service program is used to collect client information, send the collected client information to the server, and execute operation instruction transmitted from the server to manage printing operation; client information database 630, which is used to save the client information collected by the client; print job information database 640, which is used to save print job information; file server 650, which is used to save and record intercepted data stream of each page of document or image document of part of it. The operations of these parts are the same as the above methods, and therefore, the description thereof is omitted.

It should be understood that the modular division illustrated in FIG. 6 is exemplary only, the person skilled in the art can also implement the method for document printing management and control, and document source tracking according to the present invention with other configurations according to practical situation.

In addition, it should be pointed out that the method for document printing management and control, and document source tracking described in the present invention is not only applicable to physical local area networks and network architectures based on TCP/IP protocol, but can also be extended flexibly from local network to long-distance networks and remote networks. The server is connected to long-distance computer via Virtual Private Network (VPN) or internet, implementing centralized management on large scale complex network, and can also be connected to remote computer via internet, implementing remote management on affiliated agencies.

The present invention has been described above in detail referring to the accompanying drawings and embodiments, however, it should be understood that the present invention is not limited to the above disclosed particular embodiments, and modifications and variations that can be easily thought of on this basis by the person skilled in the art should be included in the protection scope of the present invention.

The invention claimed is:

1. A method for document printing management and control, the method comprising:

deploying and running a printing management service program on a server, wherein the printing management service program is used to save client information, monitor and manage a client computer, set a printing management strategy, and transmit an operation instruction of performing the printing management strategy to client;

deploying and running a printing monitoring service program on the client, wherein the printing monitoring service program is used to collect the client information, send the collected client information to the server, perform the operation instruction transmitted from the server, and manage a printing operation, wherein the printing management service program deployed on the server and the printing monitoring service program deployed on the client perform a document printing management and control operation according to the following steps:

the printing monitoring service program on the client collects client information each time the client computer restarts, and sends the collected client information to the server;

the printing management service program on the server saves the client informational monitors and manages a power-on state of the client computer and an operation state of the printing monitoring service program;

the printing management service program on the server sets the printing management strategy and transmits the operation instruction of performing the printing management strategy to the client, wherein the printing management strategy includes authorizing at least one of the following to a client printer: model, name, printer type, application program type and confidential level of printing document; and the printing monitoring service program on the client performs the operation instruction transmitted from the server and manages the printing operation.

2. The method according to claim 1, wherein, when the printing monitoring service program on the client sends the collected client information to the server, the printing monitoring service program checks whether the same client information already exists in a client information database specified by the server, and if the same client information does not exist in the client information database, the client information is saved in the client information database.

3. The method according to claim 1, wherein the client information includes user name of the client, IP address of the client computer, network card MAC address and list information of all installed printers.

4. The method according to claim 1, wherein the printing management service program on the server monitors and manages the power-on state of the client computer and the operation state of the printing monitoring service program according to the following steps:

detecting whether the client computer is powered on;

if the client computer is in power-on state, further detecting whether the printing monitoring service program on the client runs normally; and if the client computer is in the power-on state and the printing monitoring service program on the client runs abnormally, sending an error message to an administrator.

5. The method according to claim 1, wherein the printer type includes at least one of local printer, shared printer, network printer and virtual printer.

6. The method according to claim 1, wherein the printing management service program on the server sets the printing management strategy, which further includes setting sensitive keywords of a document title, restricting a print job with the sensitive keywords existing in the document title from being printed out normally, or automatically converting the print job for manual review, and wherein the print job can only be printed after being approved by an administrator.

7. The method according to claim 1, wherein the step that the printing monitoring service program on the client manages the printing operation includes the following steps:

when a user of the client opens a document editing application program and selects a printer to output a print job, the printing monitoring service program on the client intercepts a printing operation instruction, extracts print job information, and sequentially executes the operation instruction transmitted from the server to determine whether the printing operation conforms to authorization conditions in the printing management strategy set in the printing management service program on the server, and terminates an illegal printing operation not conforming to the authorization conditions, wherein the print job information includes at least one of printing time, IP address of the client computer, user name, name of application program, printer type, printer name, document title, number of copies and number of printing pages;

for a legal print job, the printing monitoring service program records the print job information, saves the print job information in the print job information database as an information record, and returns a database key value identifying the information record;

the printing monitoring service program sends a JOB-RESUME message to control the printer to print page by page and sequentially intercepts a data stream of each page of the printed document or a part thereof;

after finishing processing the legal printing operation, the printing monitoring service program records the intercepted data stream of each page of the printed document or a part thereof in image format, and uploads the image document to a file server for backup according to the returned database key value.

8. The method according to claim 7, wherein the printing management service program on the server sets the management strategy, which further includes setting document source tracking information.

9. The method according to claim 8, wherein the step that the printing management service program on the server sets the document source tracking information includes the following steps:

setting whether the document source tracking information is embedded according to the difference in time periods;

setting whether the document source tracking information is embedded according to the difference in application programs;

setting a carrier type of the embedded document source tracking information; and designating unit code information as the document source tracking information.

10. The method according to claim 9, wherein the carrier type includes at least one of the followings: word, image, and table in the document's own contents, and extra information carrier.

11. The method according to claim 10, wherein the extra information carrier is perturbing dots and/or a one- or two-dimensional barcode.

12. The method according to claim 9, wherein, when the printer prints a main page, the printing monitoring service program embeds the document source tracking information in a printed paper document using a watermarking embedding algorithm.

13. The method according to claim 12, wherein the document source tracking information includes at least one of the following: the unit code information designated by the server, the returned database key value, any item included in the print job information or any combination thereof.

14. A method for document source tracking, including the following steps:

executing the method for document printing management and control according to claim 13 to embed the document source tracking information in the printed paper document;

converting the printed or copied paper document into an image data document in electronic format through a scanner;

running an identification algorithm corresponding to the watermarking embedding algorithm used to embed the document source tracking information to detect the document source tracking information;

identifying a source of the printing document from the print job information enquired in the print job information database according to the unit code information in the detected document source tracking information and/or according to the database key value in the detected document source tracking information; and downloading an image document backup from the file server using the database key value in the detected document source tracking information, wherein the downloaded image document is compared with the printed paper document.

15. A system for document printing management and control, and document source tracking, including:

a server, which is deployed with a printing management service program, wherein the printing management service program is used to save a client information database, monitor and manage a client computer, set a printing management strategy, and transmit an operation instruction of executing the printing management strategy to client, and wherein the client information database is used to save client information collected by the client;

the client, which is deployed with a printing monitoring service program, wherein the printing monitoring service program is used to collect the client information, send the collected client information to the server, and execute the operation instruction transmitted from the server to manage a printing operation;

a print job information database, which is used to save print job information; and a file server, which is used to save and record an image document of an intercepted data stream of each page of document or part of the data stream, wherein the server, which is deployed with the printing management service program, and the client, which is deployed with the printing monitoring service program, perform a document printing management and control operation in which:

the printing monitoring service program on the client collects client information each time the client computer restarts and sends the collected client information to the server;

the printing management service program on the server saves the client information and monitors and manages a power-on state of the client computer and an operation state of the printing monitoring service program;

the printing management service program on the server sets the printing management strategy and transmits the operation instruction of performing the printing management strategy to the client, wherein the printing management strategy includes authorizing at least one of the following to a client printer: model, name, printer type, application program type and confidential level of printing document; and the printing monitoring service program on the client performs the operation instruction transmitted from the server and manages the printing operation.

16. The method according to claim 2, wherein the client information includes user name of the client, IP address of the client computer, network card MAC address and list information of all installed printers.

* * * * *

UNITED STATES PATENT AND TRADEMARK OFFICE
CERTIFICATE OF CORRECTION

| | |
|---|---|
| PATENT NO. | : 8,976,383 B2 |
| APPLICATION NO. | : 13/976335 |
| DATED | : March 10, 2015 |
| INVENTOR(S) | : Wenfa Qi et al. |

It is certified that error appears in the above-identified patent and that said Letters Patent is hereby corrected as shown below:

IN THE CLAIMS:

Column 12, Line 42, Claim 1, delete "informational" and insert -- information --

Signed and Sealed this
Fourteenth Day of July, 2015

Michelle K. Lee
*Director of the United States Patent and Trademark Office*